(12) United States Patent
Kashiwagi et al.

(10) Patent No.: US 10,141,789 B2
(45) Date of Patent: Nov. 27, 2018

(54) CONVERTER AND POWER RECEIVING APPARATUS

(71) Applicants: CENTRAL JAPAN RAILWAY COMPANY, Nagoya-shi, Aichi (JP); TOYO ELECTRIC MFG. CO., LTD., Chuou-ku, Tokyo (JP)

(72) Inventors: Yuki Kashiwagi, Nagoya (JP); Toshiaki Murai, Nagoya (JP); Yoshiyasu Hagiwara, Nagoya (JP); Tadashi Sawada, Nagoya (JP); Takayoshi Tanaka, Yokohama (JP); Takehisa Kashima, Yokohama (JP)

(73) Assignees: CENTRAL JAPAN RAILWAY COMPANY, Nagoya-shi, Aichi (JP); TOYO ELECTRIC MFG. CO., LTD., Chuou-ku, Tokyo (JP)

( * ) Notice: Subject to any disclaimer, the term of this patent is extended or adjusted under 35 U.S.C. 154(b) by 0 days.

(21) Appl. No.: 15/566,331

(22) PCT Filed: Apr. 13, 2016

(86) PCT No.: PCT/JP2016/002001
§ 371 (c)(1),
(2) Date: Oct. 13, 2017

(87) PCT Pub. No.: WO2016/166976
PCT Pub. Date: Oct. 20, 2016

(65) Prior Publication Data
US 2018/0109143 A1 Apr. 19, 2018

(30) Foreign Application Priority Data

Apr. 14, 2015 (JP) .................................. 2015-082638

(51) Int. Cl.
*H02J 50/12* (2016.01)
*H02M 7/04* (2006.01)
(Continued)

(52) U.S. Cl.
CPC ............. *H02J 50/12* (2016.02); *H02M 7/043* (2013.01); *H02M 7/48* (2013.01); *H04B 5/0037* (2013.01);
(Continued)

(58) Field of Classification Search
None
See application file for complete search history.

(56) References Cited

U.S. PATENT DOCUMENTS 6,078,110 A * 6/2000 Zakharian ............. H02J 3/1835
257/595
2014/0266035 A1* 9/2014 Cern ........................ H02J 7/025
320/108

FOREIGN PATENT DOCUMENTS

JP H10108390 A 4/1998
JP 2005168254 A * 6/2005
(Continued)

OTHER PUBLICATIONS

Jun. 28, 2016, International Search Report issued in the International Patent Application No. PCT/JP2016/002001.
(Continued)

*Primary Examiner* — Alejandro Rivero
(74) *Attorney, Agent, or Firm* — Kenja IP Law PC

(57) ABSTRACT

An equivalent circuit of a converter (4) is represented by a series connection between an equivalent capacitor (41) and an equivalent resistor (42), and the converter (4) includes a controller that adjusts a power factor of the input power by controlling a capacitive reactance (Xc) of the equivalent capacitor (41).

8 Claims, 8 Drawing Sheets

(51) Int. Cl.
*H04B 5/00* (2006.01)
*H02M 7/48* (2007.01)
(52) U.S. Cl.
CPC ......... *H04B 5/0081* (2013.01); *H04B 5/0093* (2013.01)

(56) References Cited

FOREIGN PATENT DOCUMENTS

| JP | 2012143135 A | | 7/2012 |
|---|---|---|---|
| JP | 2014024365 A | * | 2/2014 |
| JP | 2015167431 A | | 9/2015 |

OTHER PUBLICATIONS

Oct. 17, 2017, International Preliminary Report on Patentability issued in the International Patent Application No. PCT/JP2016/002001.

* cited by examiner

Prior Art

CONVERTER AND POWER RECEIVING APPARATUS

CROSS-REFERENCE TO RELATED APPLICATION

This application claims priority to and the benefit of Japanese Patent Application No. 2015-082638 filed Apr. 14, 2015, the entire contents of which are incorporated herein by reference.

TECHNICAL FIELD

This disclosure relates to a converter and a power receiving apparatus for converting electric power supplied from a secondary coil.

BACKGROUND

In recent years, non-contact power transmission methods for transmitting electric power without passing through a metal contact, connector, or the like have been increasingly used in cordless phones, electric shavers, electric toothbrushes, and the like. In such non-contact power transmission methods, electric power is transmitted by electromagnetic induction between a plurality of coils.

For example, as illustrated in FIG. 9, patent literature 1 (PTL 1) discloses non-contact power transmission equipment in which a secondary coil 102 of a power receiving apparatus 100 is magnetically coupled to a primary coil 101, and the secondary coil 102 is connected in series with a capacitor 103. The power receiving apparatus 100 supplies electric power generated in the secondary coil 102 to a load 107 via a rectifier 104, a filter capacitor 105, and a chopper circuit 106. In this way, in the power receiving apparatus 100, the secondary coil 102 and the capacitor 103 are connected in series and therefore resonate, reducing the reactive power among the electric power generated in the secondary coil 102. Accordingly, the power receiving apparatus 100 can supply electric power to the load 107 while improving the power factor of the electric power.

As illustrated in FIG. 10, patent literature 2 (PTL 2) discloses a power receiving apparatus 200 that includes a secondary coil 202, magnetically coupled to a primary coil 201, and a resonance capacitor 203. The power receiving apparatus 200 further includes a transducer 204 that brings the AC power to a power factor of one by setting parameters of the transducer on the basis of circuit constants measured in advance. The transducer 204 converts the AC power to DC power and supplies the converted DC power to a load 206.

CITATION LIST

Patent Literature

PTL 1: JP H10-108390 A
PTL 2: JP 2012-143135 A

SUMMARY

Technical Problem

The conventional high-frequency power receiving circuit using resonance as disclosed in PTL 1, however, must be provided with a number of devices as described above, including the rectifier 104 and the filter capacitor 105 or the like, leading to the problem of increased weight of the power receiving apparatus 100 overall. By including a number of devices, this power receiving apparatus 100 also has the problem of high manufacturing costs.

The power receiving apparatus 200 disclosed in PTL 2 is not provided with a rectifier and thus achieves reduced weight. Furthermore, by parameters of the transducer being set on the basis of circuit constants measured in advance, the transducer can accurately compensate for reactance.

However, since the inductance of the secondary coil 202 varies by temperature, flowing current, and age, the inductance needs to be readjusted sequentially, or else the reactance can no longer be compensated for accurately. Furthermore, in order to compensate for the reactance accurately, it is unrealistic to change the capacitance of the resonance capacitor 203 provided in the power receiving apparatus 200. Like the inductance of the secondary coil 202, the capacitance of the resonance capacitor 203 also varies by temperature, flowing current, and age, preventing the reactance from being compensated for accurately even by adjusting the capacitance of the resonance capacitor 203. Therefore, the parameters of the transducer need to be adjusted in order to compensate for reactance accurately, but the cost and time required for such adjustment are problematic.

In light of these considerations, this disclosure provides a converter and a power receiving apparatus that can improve the power factor, of input power to the converter, resulting from a change in the inductance of a secondary coil.

Solution to Problem

To this end, a converter according to this disclosure is for converting input power input from a secondary coil that generates electric power, the converter including: a controller, such that an equivalent circuit of the converter is represented by a series connection between an equivalent capacitor and an equivalent resistor, and the controller is configured to adjust a power factor of the input power by controlling a capacitive reactance of the equivalent capacitor.

In the converter according to this disclosure, the controller may perform control so that the equivalent capacitor has a capacitive reactance that maximizes a resistance of the equivalent resistor in a state of constant output power.

In the converter according to this disclosure, the controller may perform control so that the equivalent capacitor has a capacitive reactance that minimizes a current passing through the equivalent resistor in a state of constant output power.

In the converter according to this disclosure, the controller may calculate a reactive component of the input power in accordance with the secondary coil and with an open voltage and a short-circuit current of the converter and may perform control so that the equivalent capacitor has a capacitive reactance that cancels out the reactive component.

A power receiving apparatus according to this disclosure includes the aforementioned converter and the secondary coil.

The power receiving apparatus according to this disclosure may further include a resonance capacitor connected in series between the secondary coil and the converter.

Advantageous Effect

According to this disclosure, the power factor of source power resulting from a change in the inductance of a secondary coil can be improved.

DETAILED DESCRIPTION

An embodiment of this disclosure is described below with reference to FIGS. 1 to 8.

<<Outline of Power Receiving Apparatus>>

Figure 1:
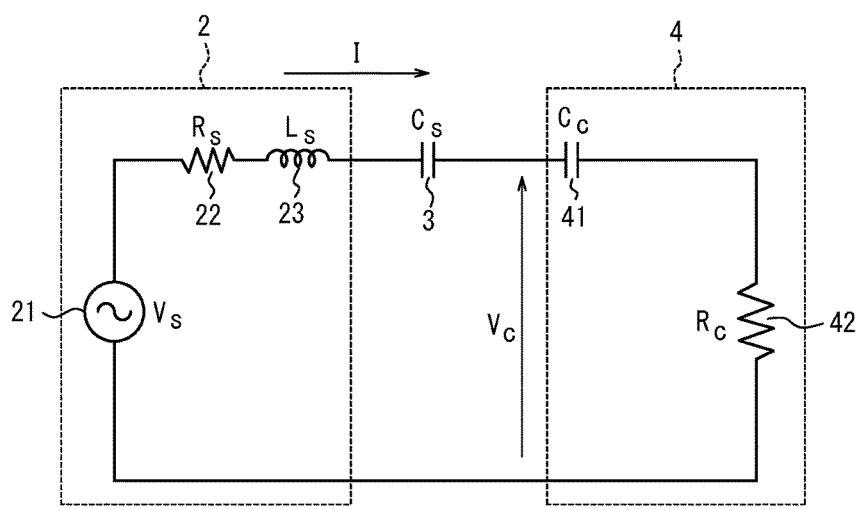
FIG. 1 is an equivalent circuit diagram of a circuit illustrating the electrical configuration of a power receiving apparatus according to an embodiment of this disclosure.

First, with reference to FIG. 1, a power receiving apparatus 1 of this embodiment is described.

The power receiving apparatus 1 adjusts the power factor of AC power generated in a secondary coil 2, converts the AC power to DC power, and outputs the DC power. In this description, "to adjust" refers to bringing the power factor of AC power closer to one. As illustrated in FIG. 1, the power receiving apparatus 1 includes the secondary coil 2, a resonance capacitor 3, and a converter 4. The secondary coil 2, resonance capacitor 3, and converter 4 are connected in series.

The secondary coil 2 is magnetically coupled to a non-illustrated primary coil and generates electric power as a result of magnetic variation generated by the primary coil. The secondary coil 2 can be represented by an equivalent circuit that includes an AC power source 21, a resistor 22, and an inductor 23. The voltage of the AC power source 21 is labeled below as Vs, the resistance of the resistor 22 as Rs, and the inductance of the inductor 23 as Ls.

The resonance capacitor 3 is connected in series between the secondary coil 2 and the converter 4. The capacitance Cs of the resonance capacitor 3 is set so that the secondary coil 2 and the resonance capacitor 3 resonate, bringing the power factor of the AC power generated by the secondary coil 2 closer to one.

The converter 4 includes an equivalent capacitor 41 and an equivalent resistor 42. The capacitance of the equivalent capacitor 41 is labeled below as Cc, and the resistance of the equivalent resistor 42 as Rc.

The converter 4 includes a voltage measurement unit, a current measurement unit, and a controller, which are not illustrated. The voltage measurement unit measures converter voltage Vc. The current measurement unit measures the current I flowing through the equivalent resistor 42. The controller is implemented by a central processing unit (CPU) and adjusts the power factor of input power by controlling the capacitive reactance Xc of the equivalent capacitor 41.

The equivalent capacitor 41 adjusts the misalignment in the circuit constants (Ls and Cs). If the inductance Ls of the inductor 23 changes because of factors such as temperature, flowing current, and age, then despite connecting the resonance capacitor 3 that has a capacitance of Cs set as described above, the power factor of the input power that depends on the converter voltage Vc and the current I ends up being a value below one. Therefore, the equivalent capacitor 41 adjusts the power factor of the input power to the converter 4.

The equivalent resistor 42 adjusts the electric power output by the converter 4.

As illustrated in FIG. 1, for the converter 4, the relationship in Equation (1) holds between the current I, the converter voltage Vc, the capacitive reactance Xc (1/ωCc) of the equivalent capacitor 41, and the resistance Rc of the equivalent resistor 42. Here, ω is the frequency of the input power.

$$Vc = \sqrt{Rc^2 + \frac{1}{(\omega Cc)^2}} \times I \qquad \text{Equation (1)}$$

The converter 4 changes the capacitive reactance Xc by controlling the converter voltage Vc, thereby finely adjusting the power factor of the input power.

<Outline of First Adjustment>

The method for the power receiving apparatus 1 to adjust the power factor of the input power to the converter 4 upon activation is described.

The controller sets the capacitive reactance Xc of the equivalent capacitor 41 to a capacitive reactance that cancels out the reactive component.

Figure 2:
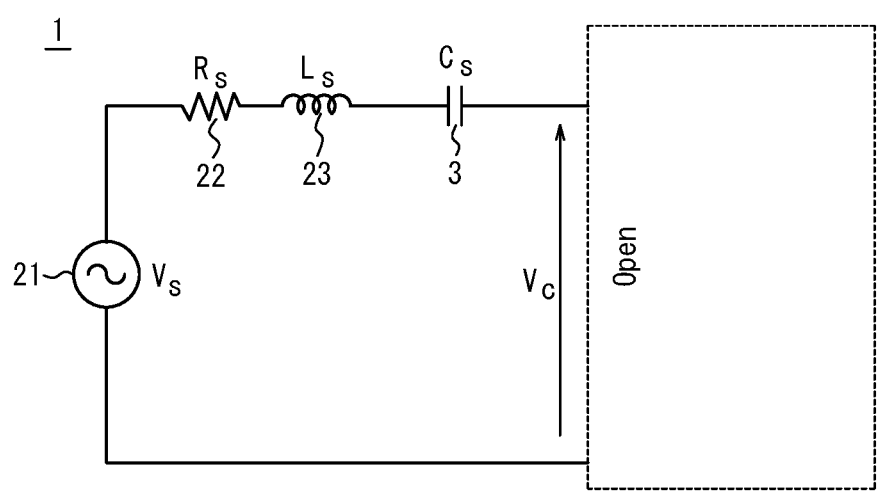
FIG. 2 is an equivalent circuit diagram for the case of opening the input terminal of the converter 4 in the circuit in FIG. 1.
Figure 3:
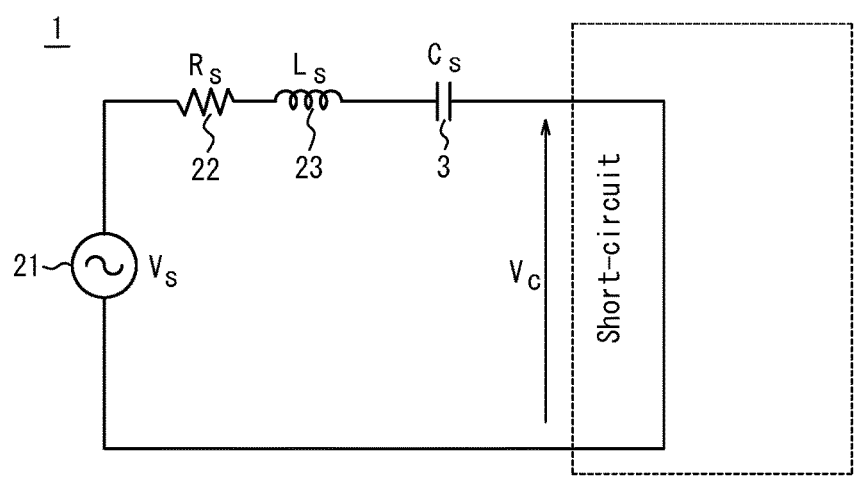
FIG. 3 is an equivalent circuit diagram for the case of causing a short circuit in the input terminal of the converter 4 in the circuit in FIG. 1.

In greater detail, first, the controller opens the input terminal of the converter 4 as illustrated in FIG. 2, and the voltage measurement unit measures an open voltage Vsopen. Next, the controller sets the converter voltage Vc to zero by short circuiting the input terminal of the converter 4, as illustrated in FIG. 3, and the current measurement unit measures the short circuit current Ishort.

The controller calculates the impedance Z using Equation (2) and Equation (3).

$$Vsopen = Z \times Ishort \qquad \text{Equation (2)}$$

$$Z = \sqrt{Rs^2 + \left(\omega Ls - \frac{1}{\omega Cs}\right)^2} \qquad \text{Equation (3)}$$

Since the resistance Rs of the resistor 22 is an extremely small, known value, the controller can calculate the reactive component ωLs−1/ωCs of the input power to the converter 4. The controller also brings the power factor closer to one by performing control upon each activation so that the capacitive reactance Xc included in the converter 4 becomes a value that cancels the reactive component ωLs−1/ωCs of the input power calculated in this way.

<Outline of Second Adjustment>

Figure 4:
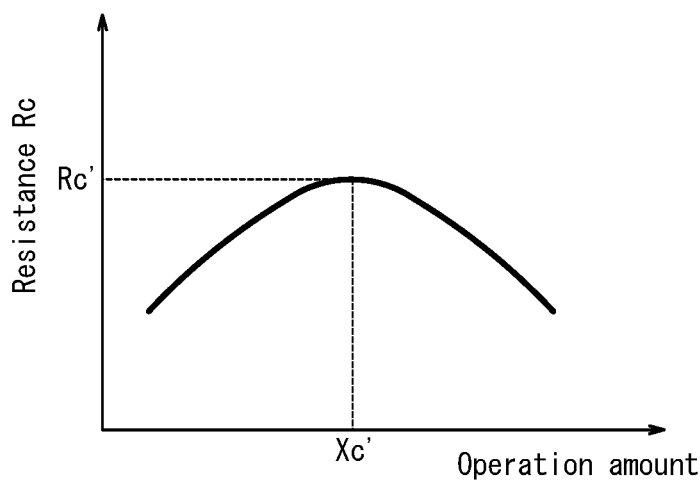
FIG. 4 is a graph of the change in resistance with respect to the change in capacitive reactance.

An outline of a method for adjusting the power factor of the input power to the converter 4 at the time of operation by the power receiving apparatus 1 is now described. Using Equation (1) for the equivalent circuit in FIG. 1, the controller performs control so that the equivalent capacitor 41 has the capacitive reactance Xc' for which, as illustrated in FIG. 4, the resistance Rc of the equivalent resistor 42 is maximized in a state of constant output power.

In greater detail, the controller changes (increases or decreases) the capacitive reactance Xc with the output power in a constant state. The resistance Rc of the equivalent resistor 42 is then measured as an output control parameter.

If the resistance Rc measured at this time is greater than the resistance Rc measured the previous time, the controller again changes the capacitive reactance Xc similarly. In other words, the controller increases the capacitive reactance Xc again if the controller increased the capacitive reactance Xc in the previous change and decreases the capacitive reactance Xc again if the controller decreased the capacitive reactance Xc in the previous change.

If the measured resistance Rc is less than the resistance Rc measured the previous time, the controller changes the capacitive reactance Xc in the opposite direction from the previous time. In other words, the controller decreases the capacitive reactance Xc if the controller increased the capacitive reactance Xc in the previous change and similarly increases the capacitive reactance Xc if the controller decreased the capacitive reactance Xc in the previous change.

In this way, by repeating measurement of the resistance Rc each time the controller changes the capacitive reactance Xc, the capacitive reactance Xc' at which the resistance Rc becomes nearly the maximum value Rc' is identified. The controller sets the equivalent capacitor 41 to have the capacitive reactance Xc' identified in this way. Therefore, the power factor of the input power to the converter 4 improves, becoming closer to one.

<Outline of Third Adjustment>

Figure 5:
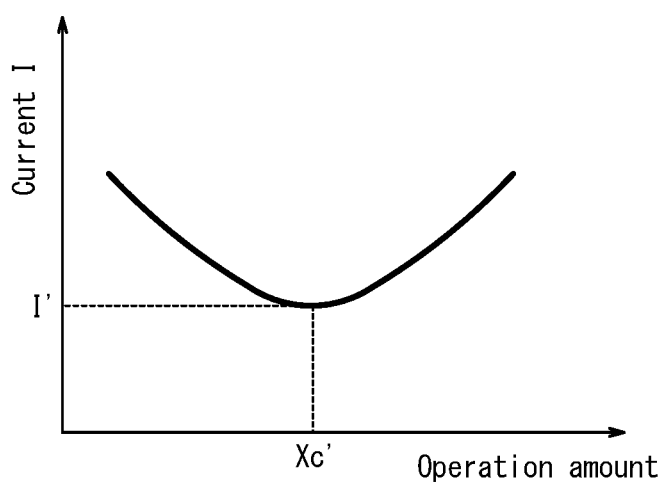
FIG. 5 is a graph of the change in current with respect to the change in capacitive reactance.

An outline of another method for adjusting the power factor of the input power to the converter 4 at the time of operation by the power receiving apparatus 1 is now described. Using Equation (1) for the equivalent circuit in FIG. 1, the controller performs control so that the equivalent capacitor 41 has the capacitive reactance Xc' for which, as illustrated in FIG. 5, the current I is minimized in a state of constant output power.

In greater detail, the controller changes (increases or decreases) the capacitive reactance Xc ($1/\omega Cc$) with the output power in a constant state, and the current measurement unit measures the current I.

If the current I measured at this time is less than the current I measured the previous time, the controller again changes the capacitive reactance Xc similarly. In other words, the controller further increases the capacitive reactance Xc if the controller increased the capacitive reactance Xc in the previous change and further decreases the capacitive reactance Xc if the controller decreased the capacitive reactance Xc in the previous change.

If the measured current I is greater than the current I measured the previous time, the controller changes the capacitive reactance Xc in the opposite direction from the previous time. In other words, the controller decreases the capacitive reactance Xc if the controller increased the capacitive reactance Xc in the previous change and increases the capacitive reactance Xc if the controller decreased the capacitive reactance Xc in the previous change.

In this way, by repeating measurement of the current I each time the controller changes the capacitive reactance Xc, the capacitive reactance Xc' at which the current I becomes nearly the minimum value I' is identified. The controller sets the equivalent capacitor 41 to have the capacitive reactance Xc' identified in this way. Therefore, the power factor of the power that is input to the converter 4 improves, becoming closer to one.

<<Detailed Configuration of Power Receiving Apparatus>>

Figure 6:
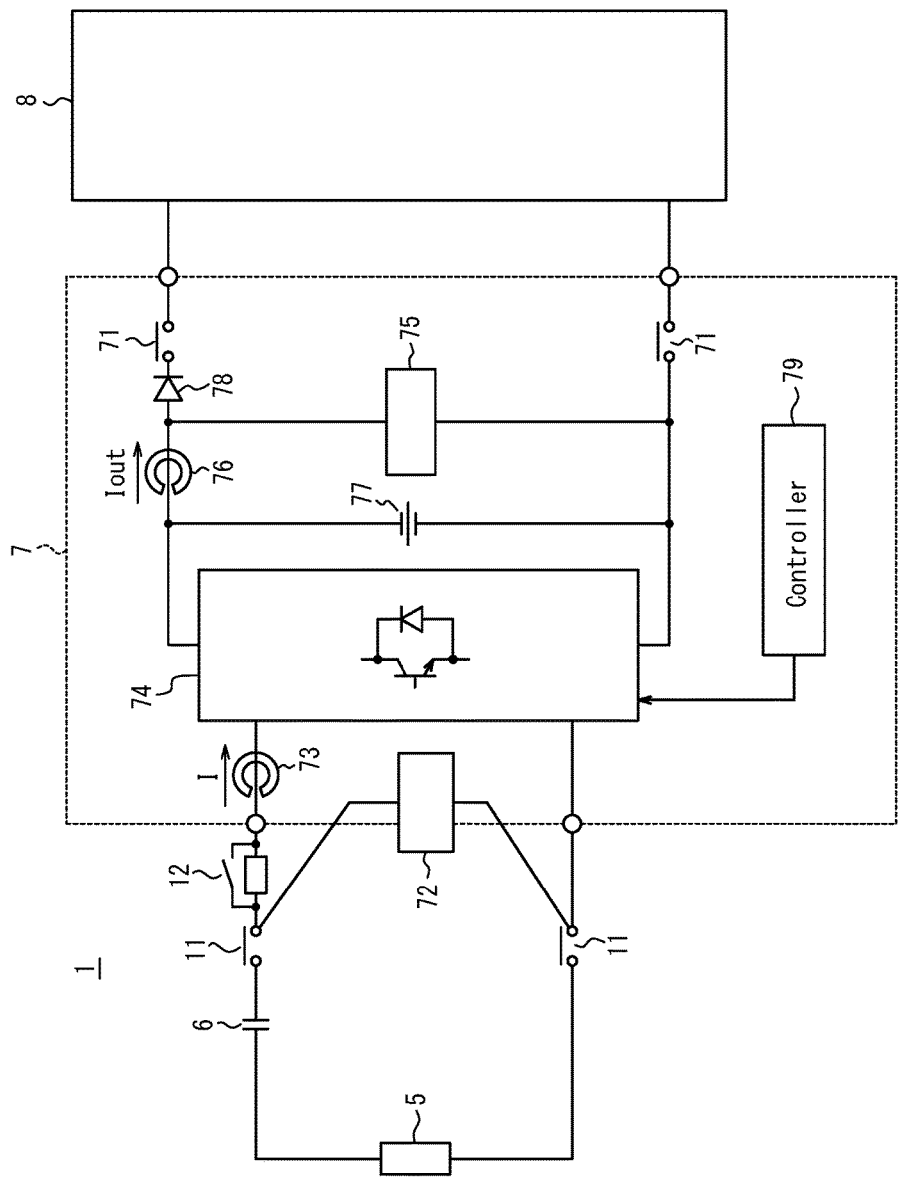
FIG. 6 is a circuit diagram illustrating the electrical configuration of the power receiving apparatus in FIG. 1.

With reference to FIG. 6, the configuration of the power receiving apparatus 1 is now described in detail. FIG. 6 is a circuit diagram illustrating the electrical configuration of the power receiving apparatus 1 in FIG. 1.

The power receiving apparatus 1 includes a secondary coil 5, a resonance capacitor 6, a converter 7, a load 8, input side contactors 11, and a charging resistor 12. The secondary coil 5 corresponds to the secondary coil in the equivalent circuit diagram of FIG. 1, the resonance capacitor 6 corresponds to the resonance capacitor 3 in the equivalent circuit diagram of FIG. 1, and the converter 7 corresponds to the converter 4 in the equivalent circuit diagram of FIG. 1.

The resonance capacitor 6 is connected in series between the secondary coil 5 and the converter 7 and adjusts the power factor of the power source by canceling out the reactive component of the input power that is input to the converter 7.

The converter 7 converts the AC power generated by the secondary coil 5 to DC power. The converter 7 further adjusts the power factor of AC power supplied from the secondary coil 5 and adjusted by the resonance capacitor 6. The converter 7 includes output side contactors 71, an input voltage detector 72, an input current detector 73, a transducer 74, an output voltage detector 75, an output current detector 76, a filter capacitor 77, a diode 78, and a controller 79.

The output side contactors 71 are provided on each output terminal side of the converter 7 and serve to open and connect the circuit between each output terminal of the converter 7 and the load 8.

The input voltage detector 72 detects the converter voltage Vc between the input terminals of the converter 7 (corresponding to the converter voltage Vc in the equivalent circuit diagram of FIG. 1). The input current detector 73 detects the current I input into the converter 7 (corresponding to the current I in the equivalent circuit diagram of FIG. 1).

The transducer 74 is implemented by a switching element and a diode or the like and converts AC power to DC power.

The output voltage detector 75 detects the voltage between the output terminals of the converter 7. The output current detector 76 detects the current output from the converter 7.

The filter capacitor 77 is connected to the transducer 74 in parallel. The diode 78 is connected on one side of the parallel contact between the filter capacitor 77 and the transducer 74 to prevent back flow of current from the load 8. The controller 79 designates the voltage of the power converted and output by the converter 7. The controller 79 also calculates the effective value of the current I input to the converter 7.

The load 8 is connected to the output terminals of the converter 7 and is supplied the power output from the converter 7. An example of the load 8 is a battery device.

The input side contactors 11 are provided on each input terminal side of the converter 7 and serve to open and connect the circuit between each input terminal of the converter 7 and the secondary coil 5.

The charging resistor 12 prevents overcurrent from flowing as the current I of the converter 7 when the filter capacitor 77 is initially charged.

<<Test Results Based on Operation Test Circuit>>

Figure 7:
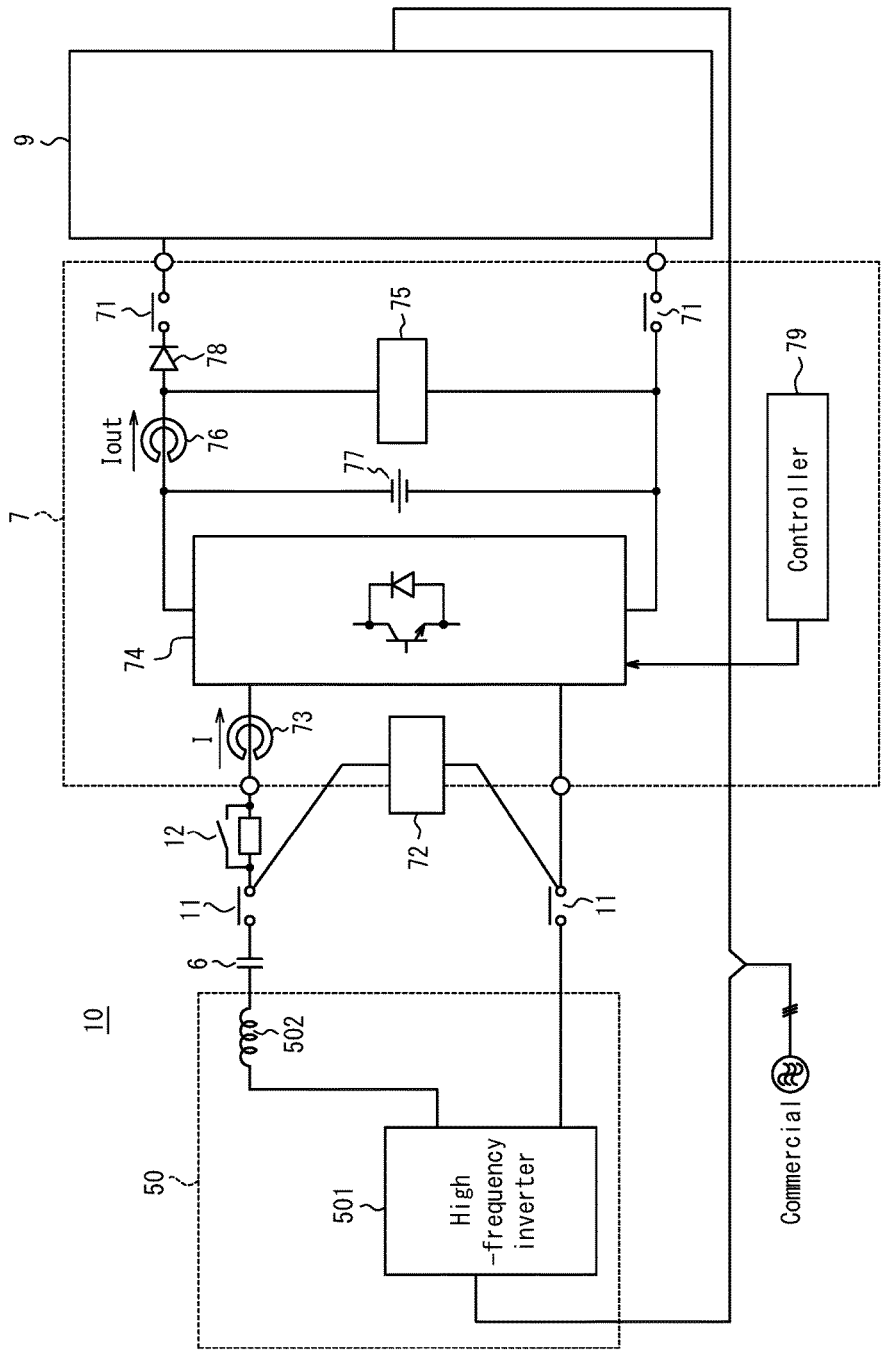
FIG. 7 is a circuit diagram of a test circuit for a trial operation of the equivalent circuit illustrated in FIG. 1.

With reference to FIG. 7, a test power receiving apparatus 10 for testing the power receiving apparatus 1 is now described in detail. FIG. 7 represents a partial modification to the circuit diagram in FIG. 6.

The test power receiving apparatus 10 includes a mock secondary coil 50, a resonance capacitor 6, a converter 7, a mock battery device 9, input side contactors 11, and a charging resistor 12.

The resonance capacitor 6, converter 7, input side contactors 11, and charging resistor 12 are similar to the resonance capacitor 6, converter 7, input side contactors 11, and charging resistor 12 described in the detailed configuration of the power receiving apparatus 1.

The mock secondary coil 50 supplies AC power to the converter 7 and includes a high-frequency inverter 501 and a reactor 502. The high-frequency inverter 501 generates, by one pulse operation, voltage equivalent to the induced voltage generated by the secondary coil 5 in the circuit diagram of FIG. 6. The reactor 502 is connected in series to the high-frequency inverter 501.

The mock battery device 9 is a load of the converter 7 and is exemplified in this embodiment by a regenerative inverter.

Table 1 lists an example of specifications for the converter 7, the high-frequency inverter 501, and the mock battery device 9.

TABLE 1

|  | Converter | High-frequency inverter | Mock battery device |
|---|---|---|---|
| Rated power | up to 20 kW | 55 kW | 45 kW |
| Output voltage | 600 V | 200 V to 500 V | 200 V |
| Output frequency | DC | 5 kHz to 20 kHz | 50 Hz |
| Pulse mode | one pulse | one pulse | 5 kHz PWM |
| Input voltage | 250 V to 450 V | 200 V to 600 V | 600 V |

<Test Results Related to First Adjustment>

A method for adjusting the input power to the converter 7 upon activation in the test power receiving apparatus 10 configured as above is described in detail, and the results of adjusting the input power using the test power receiving apparatus 10 are indicated.

First, in the test circuit illustrated in FIG. 7, the controller 79 opens the input side contactors 11, and the input voltage detector 72 measures the open voltage Vsopen at this time. The controller 79 then saves the measured open voltage Vsopen in a non-illustrated memory or the like.

By controlling a switching element to short-circuit the connection between the input terminals, the controller 79 sets the converter voltage Vc to zero, and the input current detector 73 measures the short circuit current Ishort at this time. The controller 79 then saves the measured short-circuit current Ishort in a non-illustrated memory or the like.

Subsequently, the controller 79 calculates the reactive component $\omega Ls - 1/\omega Cs$ using Equation (2) and Equation (3) in accordance with the voltage Vsopen and the current Ishort saved in the memory or the like. The controller 79 identifies the capacitive reactance Xc' of the equivalent capacitor of the converter 7 (corresponding to the equivalent capacitor 41 in the equivalent circuit diagram of FIG. 1) so as to compensate for the calculated reactive component $\omega Ls - 1/\omega Cs$. As indicated in Table 2, the capacitive reactance Xc' identified by the controller 79 in this way is 5.5Ω. This value is approximately 1.2 times the value of 4.62Ω of the capacitive reactance Xc calculated in accordance with circuit constants measured by an LCR meter. The power factor of the power source when the capacitive reactance Xc' is 5.5Ω is 0.99, a value near one. In this way, the method according to an embodiment of this disclosure can calculate the reactive component well.

TABLE 2

| Xc calculated using circuit constants | Xc' identified with an embodiment of this disclosure | Power ratio of power source when converter 7 provided with Xc' operates |
|---|---|---|
| 4.62 Ω | 5.5 Ω | 0.99 |

<Test Results Related to Second Adjustment>

Next, a method for adjusting the power factor of input power to the converter 7 during operation in the test power receiving apparatus 10 is described in detail, and the results of adjusting the power factor of the input power to the converter 7 using the test power receiving apparatus 10 are indicated.

In the test power receiving apparatus 10, the controller 79 controls the capacitive reactance Xc of a non-illustrated equivalent capacitor pertaining to the converter 7 to adjust the power factor of input power to the converter 7. In greater detail, the controller 79 changes the capacitive reactance Xc a plurality of times, each time measuring the resistance Rc, which is a control parameter, of an equivalent resistor (corresponding to the equivalent resistor 42 in the equivalent circuit diagram of FIG. 1). As indicated in Table 3, when the controller 79 increases the capacitive reactance Xc in the $(n-1)^{th}$ iteration, the controller 79 decreases the capacitive reactance Xc in the $n^{th}$ iteration if the resistance Rc decreases as a result and increases the capacitive reactance Xc in the $n^{th}$ iteration if the resistance Rc increases as a result. Similarly, the controller 79 decreases the capacitive reactance Xc in the $(n+1)^{th}$ iteration if the resistance Rc increases as the result of a decrease in the capacitive reactance Xc in the $n^{th}$ iteration, whereas the controller 79 increases the capacitive reactance Xc in the $(n+1)^{th}$ iteration if the resistance Rc decreases as the result of a decrease in the capacitive reactance Xc in the $n^{th}$ iteration.

Similarly, when the controller 79 decreases the capacitive reactance Xc in the $(n-1)^{th}$ iteration, the controller 79 decreases the capacitive reactance Xc in the $n^{th}$ iteration if the resistance Rc increases as a result and increases the capacitive reactance Xc in the $n^{th}$ iteration if the resistance Rc decreases as a result. Similarly, the controller 79 decreases the capacitive reactance Xc in the $(n+1)^{th}$ iteration if the resistance Rc increases as the result of a decrease in the capacitive reactance Xc in the $n^{th}$ iteration, whereas the controller 79 increases the capacitive reactance Xc in the $(n+1)^{th}$ iteration if the resistance Rc decreases as the result of a decrease in the capacitive reactance Xc in the $n^{th}$ iteration.

TABLE 3

| Change in Xc in $(n-1)^{th}$ iteration | Variation in Rc resulting from change in Xc in $(n-1)^{th}$ iteration | Change in Xc in $n^{th}$ iteration |
|---|---|---|
| increase | decrease | decrease |
|  | increase | increase |
| decrease |  | decrease |
|  | decrease | increase |

Next, the results of identifying the capacitive reactance Xc at which the resistance Rc is maximized, as described above, are explained. As indicated in Table 4, with the induced voltage in the test power receiving apparatus 10 set to Vs=300V and the initial value of the capacitive reactance Xc set to Xc0=6.16Ω, the capacitive reactance Xc was changed by 0.25Ω once every 20 msec, and the simulation period was set to 25 nsec. Under these conditions, simulation results for identifying the capacitive reactance Xc at which the resistance Rc is maximized were obtained with the aforementioned method.

TABLE 4

| Conditions | | | | Results | |
|---|---|---|---|---|---|
| Induced voltage | 300 V | Operation amount ΔXc' | 0.25 Ω/ 20 msec | Power ratio | 0.995 or greater |
| Circuit constants | as per description of Table 3 | Initial value Xc0 | 6.16 Ω | | |
| | | Simulation period | 25 nsec | | |

Figure 8:
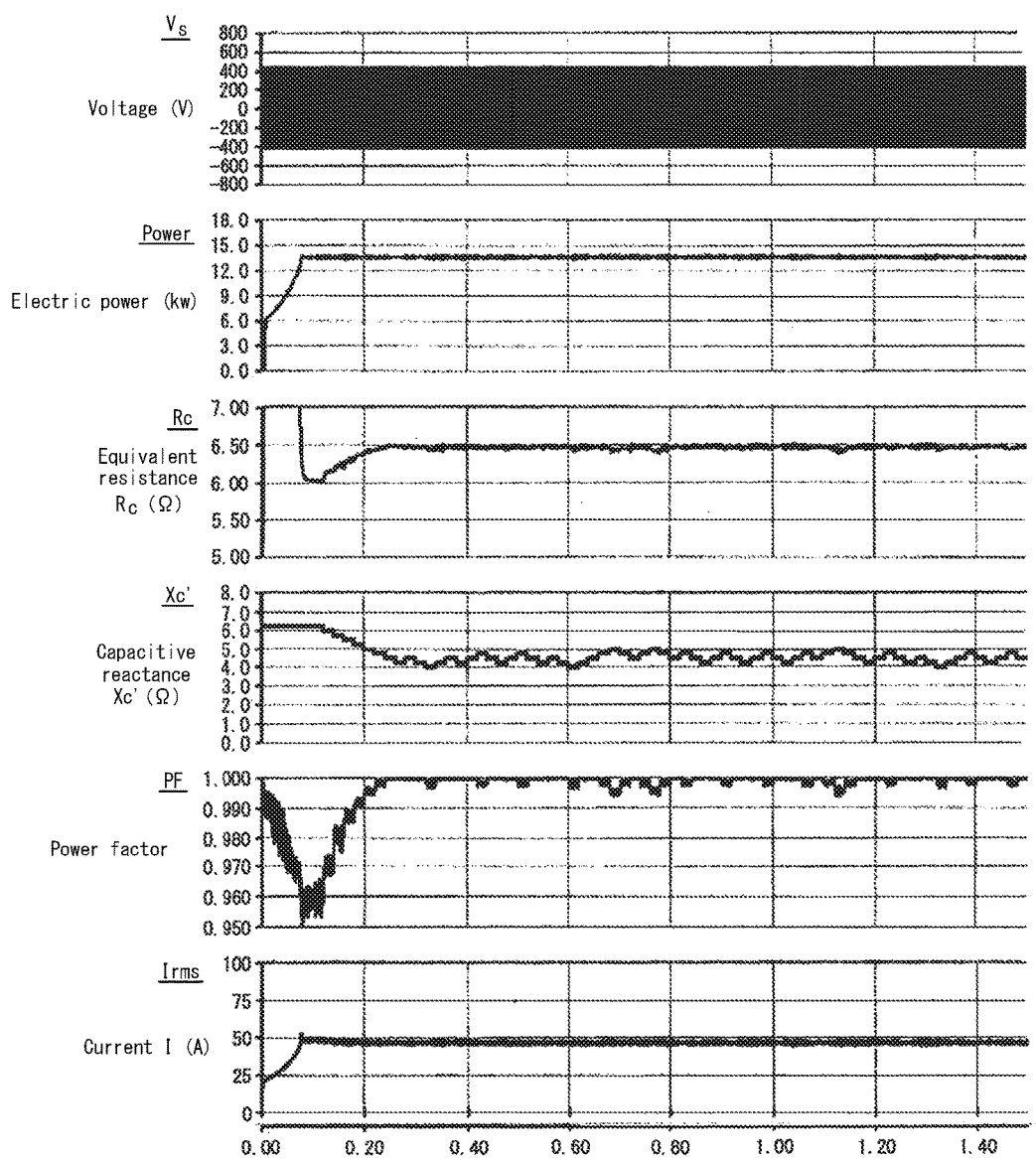
FIG. 8 is a graph illustrating the results of a simulation on the test circuit in FIG. 6.
Figure 9:
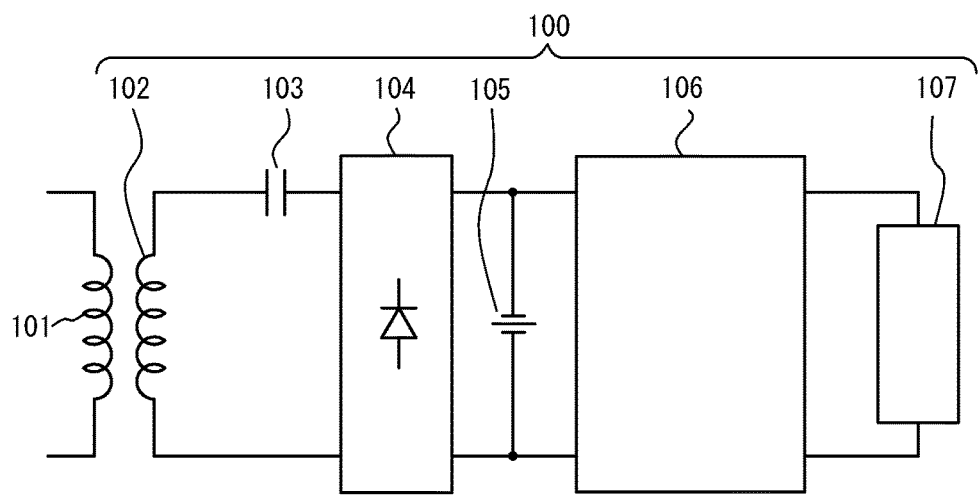
FIG. 9 is a circuit diagram illustrating the electrical configuration of a conventional power receiving apparatus.
Figure 10:
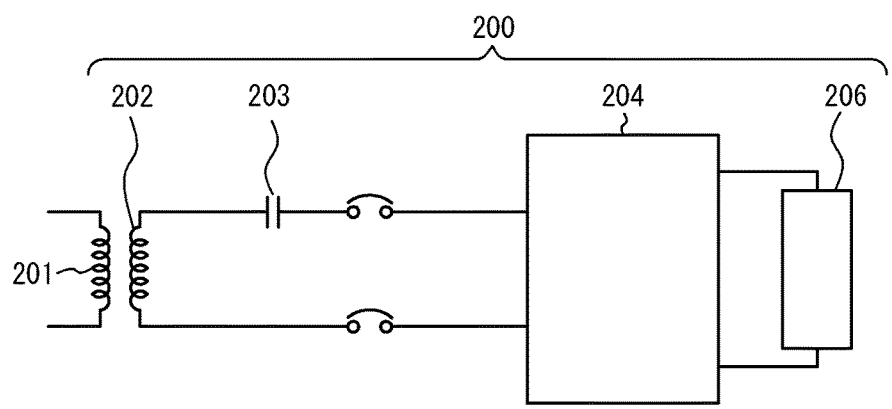
FIG. 10 is a circuit diagram illustrating the electrical configuration of another conventional power receiving apparatus.

As illustrated in FIG. 8, the simulation was performed for 1.5 seconds. In FIG. 8, the horizontal axis of each graph represents time. The converter 7 was activated at time t=0 s. In greater detail, as illustrated in the first tier of FIG. 8, generation of AC voltage with an effective value of 300 V by the high-frequency inverter 501 caused electric power with the value indicated in the second tier of FIG. 8 to be input into the converter 7. The result of changing the capacitive reactance Xc of the equivalent capacitor of the converter 7 at this time as described with reference to Table 3 and Table 4 above is indicated in the fourth tier of FIG. 8. In this simulation, as indicated in the fourth tier of FIG. 8, the change in the capacitive reactance Xc began at time t=0.1 s, and at approximately time t=0.25 s, i.e. in a short time of approximately 0.15 seconds from when the capacitive reactance Xc began to change, the resistance Rc of the equivalent resistor converged, as indicated in the third tier of FIG. 8. From the time when the resistance Rc of the equivalent resistor converged, the power factor of the power source was 0.995 or greater, as indicated in the fifth tier of FIG. 8. Also, as indicated in the sixth tier of FIG. 8, the effective value of the current I remained nearly constant from time t=0.1 s onward.

From the above, the power factor of electric power can be improved by identifying the capacitive reactance Xc pertaining to the equivalent capacitor in the above-described way and setting the equivalent capacitor to have the identified capacitive reactance Xc'.

<Test Results Related to Third Adjustment>

Next, another method for adjusting the power factor of input power to the converter 7 during operation in the test power receiving apparatus 10 is described in detail.

In the test power receiving apparatus 10, the controller 79 controls the capacitive reactance Xc of the equivalent capacitor of the converter 7 to adjust the input power to the converter 7. In greater detail, the controller 79 changes the capacitive reactance Xc a plurality of times, each time measuring the effective value Irms of the current I input into the converter 7. As indicated in Table 5, when the controller 79 increases the capacitive reactance Xc in the $(n-1)^{th}$ iteration, the controller 79 increases the capacitive reactance Xc in the $n^{th}$ iteration if the effective value Irms of the current I decreases as a result and decreases the capacitive reactance Xc in the $n^{th}$ iteration if the effective value Irms of the current I increases as a result. The controller 79 increases the capacitive reactance Xc in the $(n+1)^{th}$ iteration if the effective value Irms of the current I decreases as the result of an increase in the capacitive reactance Xc in the $n^{th}$ iteration, whereas the controller 79 decreases the capacitive reactance Xc in the $(n+1)^{th}$ iteration if the effective value Irms of the current I increases as the result of an increase in the capacitive reactance Xc in the $n^{th}$ iteration.

Similarly, when the controller 79 decreases the capacitive reactance Xc in the $(n-1)^{th}$ iteration, the controller 79 increases the capacitive reactance Xc in the $n^{th}$ iteration if the effective value Irms of the current I increases as a result and decreases the capacitive reactance Xc in the $n^{th}$ iteration if the effective value Irms of the current I decreases as a result. The controller 79 increases the capacitive reactance Xc in the $(n+1)^{th}$ iteration if the effective value Irms of the current I decreases as the result of an increase in the capacitive reactance Xc in the $n^{th}$ iteration, whereas the controller 79 decreases the capacitive reactance Xc in the $(n+1)^{th}$ iteration if the effective value Irms of the current I increases as the result of an increase in the capacitive reactance Xc in the $n^{th}$ iteration.

TABLE 5

| Change in Xc in $(n-1)^{th}$ iteration | Variation in Irms resulting from change in Xc in $(n-1)^{th}$ iteration | Change in Xc in $n^{th}$ iteration |
|---|---|---|
| increase | decrease | increase |
| | increase | decrease |
| decrease | | increase |
| | decrease | decrease |

In the above way, the converter 4 of this embodiment is represented by a series connection between the equivalent capacitor 41 and the equivalent resistor 42 and adjusts the power factor of input power by controlling the capacitive reactance Xc of the equivalent capacitor 41. Therefore, the power factor of input power to the converter 4 can be improved without changing the resonance capacitor 3 as a result of change in the inductance Ls due to heat generation, flowing current, and age-related degradation of the inductor 23 provided in the power receiving apparatus 1. Whereas operation of the power receiving apparatus 1 needs to be suspended to change the resonance capacitor 3, the converter 4 of this embodiment allows adjustment of the input power even during activation and operation of the power receiving apparatus 1, thereby reducing the downtime for maintenance of the power receiving apparatus 1.

The converter 4 of this embodiment controls the capacitive reactance Xc of the equivalent capacitor 41 in accordance with the open voltage Vsopen and the short-circuit current Ishort of the converter 4. Therefore, the capacitive reactance Xc of the equivalent capacitor 41 can be set more appropriately to bring the power factor of the input power closer to one than when setting the capacitive reactance Xc in accordance with the inductance Ls of the secondary coil 2 calculated using an LCR meter or the like. Accordingly, the converter 4 of this embodiment can improve the power factor more accurately.

Furthermore, by including the resonance capacitor 3 connected in series between the secondary coil 2 and the converter 4, the power receiving apparatus 1 of this embodiment can cancel out the majority of reactive power with the secondary coil 2 and the resonance capacitor 3 when electric power with a high frequency is generated in the secondary coil 2. Therefore, it suffices for the controller 79 of the converter 4 to perform control so that the equivalent capacitor 41 has a capacitive reactance Xc that cancels out only a relatively small reactive power that could not be cancelled out with the secondary coil 2 and the resonance capacitor 3. The converter 4 can thus identify the capacitive reactance Xc of the equivalent capacitor 41 in a short time.

In this embodiment, the first, second, and third adjustments have been described as being performed independently, but the power factor may be adjusted by performing the first adjustment upon activation of the converter 4 and performing the second adjustment once a predetermined time has elapsed after activation. Similarly, the power factor may be adjusted by performing the first adjustment upon activation of the converter 4 and performing the third adjustment once a predetermined time has elapsed after activation.

The above embodiments have been described as representative examples, but it will be apparent to a person of ordinary skill in the art that a variety of modifications and substitutions may be made within the spirit and scope of this disclosure. Accordingly, this disclosure is not limited to the above embodiments and may be changed or modified in various ways without departing from the scope of the patent claims.

REFERENCE SIGNS LIST

1 Power receiving apparatus
2 Secondary coil
3 Resonance capacitor
4 Converter
5 Secondary coil
6 Resonance capacitor
7 Converter
8 Load
9 Mock battery device
10 Test power receiving apparatus
11 Input side contactor
12 Charging resistor
21 AC power source
22 Resistor
23 Inductor
41 Equivalent capacitor
42 Equivalent resistor
50 Mock secondary coil
71 Output side contactor
72 Input voltage detector
73 Input current detector
74 Transducer
75 Output voltage detector
76 Output current detector
77 Filter capacitor
78 Diode
79 Controller
501 High-frequency inverter
502 Reactor

The invention claimed is:

1. A converter for converting input power, the converter comprising:
   a plurality of capacitors,
   a plurality of resistors, and
   a controller configured to adjust a power factor of the input power by controlling a capacitive reactance of an equivalent capacitor formed by combining the plurality of capacitors,
   wherein the controller identifies the capacitive reactance that maximizes a resistance of an equivalent resistor formed by combining the plurality of resistors and connected to the equivalent capacitor in series in a state of constant output power.

2. A power receiving apparatus comprising:
   the converter of claim 1; and
   a secondary coil to be magnetically coupled to a primary coil and generate electric power,
   wherein the secondary coil supplies the electric power to the converter as the input power.

3. The power receiving apparatus of claim 2, further comprising a resonance capacitor connected in series between the secondary coil and the converter.

4. The converter of claim 1, wherein the controller measures the resistance of the equivalent resistor each time the controller changes the capacitive reactance to identify the capacitive reactance that maximizes the resistance of the equivalent resistor.

5. A converter for converting input power, the converter comprising:
   a plurality of capacitors,
   a plurality of resistors, and
   a controller configured to adjust a power factor of the input power by controlling a capacitive reactance of an equivalent capacitor formed by combining the plurality of capacitors,
   wherein the controller identifies the capacitive reactance that minimizes a current passing through an equivalent resistor formed by combining the plurality of resistors and connected to the equivalent capacitor in series in a state of constant output power.

6. A power receiving apparatus comprising:
   the converter of claim 5; and
   a secondary coil to be magnetically coupled to a primary coil and generate electric power, wherein the secondary coil supplies the electric power to the converter as the input power.

7. The power receiving apparatus of claim 6, further comprising a resonance capacitor connected in series between the secondary coil and the converter.

8. The converter of claim 5, wherein the controller measures the current passing through the equivalent resistor each time the controller changes the capacitive reactance to identify the capacitive reactance that minimizes the current passing through the equivalent resistor.

* * * * *